United States Patent
Fuchs

(10) Patent No.: US 6,997,976 B2
(45) Date of Patent: Feb. 14, 2006

(54) FILTERING DEVICES

(75) Inventor: Karl-Hans Fuchs, Zikhron Yaaqov (IL)

(73) Assignee: Beth-El Zikhron-Yaaqov, Zikhron-Yaaqov (IL)

( * ) Notice: Subject to any disclaimer, the term of this patent is extended or adjusted under 35 U.S.C. 154(b) by 154 days.

(21) Appl. No.: 10/641,174

(22) Filed: Aug. 14, 2003

(65) Prior Publication Data

US 2004/0159237 A1    Aug. 19, 2004

(30) Foreign Application Priority Data

Feb. 13, 2003   (IL)   ..................................... 154432

(51) Int. Cl.
*B01D 53/04*    (2006.01)

(52) U.S. Cl. ..................... 96/135; 96/153; 55/DIG. 33; 55/DIG. 35

(58) Field of Classification Search ................. 55/471, 55/473, DIG. 33, DIG. 35; 95/143, 144, 95/901; 96/108, 135, 143, 153, 154
See application file for complete search history.

(56) References Cited

U.S. PATENT DOCUMENTS

| | | | | |
|---|---|---|---|---|
| 4,801,311 A | * | 1/1989 | Tolles .......................... | 95/128 |
| 4,802,898 A | * | 2/1989 | Tolles .......................... | 95/132 |
| 4,906,263 A | * | 3/1990 | von Blucher et al. ......... | 96/135 |
| 4,992,084 A | * | 2/1991 | Von Blucher et al. ......... | 96/131 |
| 5,118,329 A | * | 6/1992 | Kosaka et al. ................ | 95/143 |
| 5,198,004 A | * | 3/1993 | Vollhardt ...................... | 96/124 |
| 5,204,310 A | * | 4/1993 | Tolles et al. ................. | 502/416 |
| 5,332,426 A | * | 7/1994 | Tang et al. .................... | 96/153 |
| 5,391,338 A | * | 2/1995 | Bandel et al. ............... | 264/610 |
| 5,510,063 A | * | 4/1996 | Gadkaree et al. .......... | 264/29.7 |
| 5,656,069 A | * | 8/1997 | Nikolskaja et al. .............. | 96/4 |
| 5,714,126 A | * | 2/1998 | Frund .......................... | 422/122 |
| 6,083,439 A | * | 7/2000 | Nastke et al. ................ | 264/122 |
| 6,277,178 B1 | * | 8/2001 | Holmquist-Brown et al. . | 96/135 |
| 6,277,179 B1 | * | 8/2001 | Reymonet ...................... | 96/153 |
| 6,332,916 B1 | * | 12/2001 | Chinn et al. ................... | 95/128 |
| 6,702,875 B1 | * | 3/2004 | Jagtoyen et al. ................ | 95/90 |
| 6,764,755 B1 | * | 7/2004 | Tom et al. ................ | 428/304.4 |
| 2002/0192142 A1 | * | 12/2002 | Tillotson et al. .......... | 423/447.1 |
| 2003/0205131 A1 | * | 11/2003 | Golden et al. .................. | 95/96 |
| 2004/0237790 A1 | * | 12/2004 | von Blucher et al. ......... | 96/154 |
| 2004/0261385 A1 | * | 12/2004 | Brey et al. ..................... | 55/524 |

* cited by examiner

*Primary Examiner*—Robert H. Spitzer
(74) *Attorney, Agent, or Firm*—Pendorf & Cutliff

(57) ABSTRACT

The invention provides a low-resistance gas adsorption filter provided with an activated carbon bed of bulk density less than 0.6 gram/cubic centimeter, the activated carbon bed being free of chromium 6+ salt, the filter being characterized by a gas holding capacity exceeding 300,000 milligram Dimethyl-methyl Phosphonate (DMMP)×minute/cubic meter and an airflow resistance such that the numerical value of air flow resistance in Pascal per millimeter of bed thickness does not exceed by more than 50% the numerical value of air velocity in centimeters per second.

11 Claims, No Drawings

FILTERING DEVICES

FIELD OF THE INVENTION

The present invention relates to gas filtration. More particularly, the invention provides a gas/gas filter suitable for protection against agents used in chemical warfare.

BACKGROUND OF THE INVENTION

Due to threats of military or terrorist attacks, public and private shelters are provided to protect the population from dangers mechanical in nature, e.g. falling walls, projectiles, blast and flying debris. Many homes are also provided with security rooms for the same purpose. In recent decades it is also considered prudent to provide protection also against nuclear, chemical and biological (NBC) agents, by provision of NBC air filtration systems including blowers, which create an above-atmospheric pressure inside the protected space and provide cleaned, purified and filtered air. The above-atmospheric pressure is required in order to ensure that no unfiltered air can enter the protected space through ever-present leaks in the walls of the shelter, the door and the window seals.

As during war and emergency situations the electric power supply may be interrupted for hours or even days, a mains-driven electric blower can not be relied upon to push or pull air through a filter and into the protected space. A possible solution is to use power generators or batteries to provide electricity. However as power generators and batteries are kept for many years often without the required test and maintenance procedures, they may not be in operative condition when required. From this consideration the most reliable power source for the blower is a geared hand crank. The hand crank is however feasible only if no great effort is involved in its operation, wherefore a filter having a low flow resistance is essential.

The required capacity of the air purification system is a function of the number of persons expected to be present in the protected space. The quantity of air needed by each person is in the range of 2 to 10 $m^3/h$. Thus a family of 6 should be provided with up to 60 cubic meters of fresh air per hour.

While activated carbon filters have long been known for purification of liquids and of gases, little is known about active carbon gas/gas filters optimized for low flow resistance. The state of the art can be assessed by review of recent U.S. Patents.

In U.S. Pat. No. 5,198,004 Vollhardt discloses an activated carbon filter for removing toxic substances such as dioxins and furans from flue gases. The carbon is mixed with 30%–40% water and the gases are bubbled through the mixture before entry into a smokestack.

Tang et al. describe a self-supporting porous filter for automobile use in U.S. Pat. No. 5,332,426. Adsorbent particles and particulate thermoplastic binder particles are fused into a desired shape.

A process for manufacturing a carbon particle filter is disclosed by Bandel et al. in U.S. Pat. No. 5,391,338. A layered or woven porous ceramic material is used in combination with a fabric which is burnt away after formation of the filter body.

A filter for the selective separation of organic material from an organic phase is disclosed by Nikolskaja in U.S. Pat. No. 5,656,069. A filter material is prepared in a process wherein polyvinyl alcohol powder is mixed with active carbon powder and water in a process including compression in a mold and multi-stage heating.

Chinn et al. in U.S. Pat. No. 6,332,916 disclose a method for manufacturing an activated carbon filter containing a transition metal such as copper, cobalt, chromium or silver. A pore network is formed by a process wherein the first step is exchanging the metal with a cellulose ion exchange material.

The NBC filter which is presently in widest use in the USA is the M98 Gas Filter which has a cylindrical shape and is specified in the following table. This filter has the disadvantage of a pressure drop exceeding 1000 Pa at the stated air velocity.

| M98 Gas Filter | [inch] | [mm] |
|---|---|---|
| Length | 10.20 | 259.1 |
| Inside diameter | 16.69 | 423.9 |
| Outside diameter | 21.43 | 544.3 |
| Average diameter | 19.06 | 484.1 |
| Filter bed thickness | 2.37 | 60.2 |
| | [sq. inch] | [$cm^2$] |
| Nominal face size | 610.76 | 3,940.4 |
| | [cfm] | [$m^3/h$] |
| Airflow nominal | 200 | 339.8 |
| | [inch/s] | [cm/s] |
| Air Velocity | 9.43 | 24.0 |
| | [IWG] | [Pa] |
| Airflow resistance (when filter is new) | 4.5 | 1119 |
| Gas Adsorption: | | [mg × min/$m^3$] |
| DMMP CT-value (when filter is new) | | >300,000 |
| CK CT-value (new) | | >110,000 |
| Bulk density | | 0.623 |

DISCLOSURE OF THE INVENTION

It is therefore a broad object of the present invention to provide a filter with a substantially improved flow rate: pressure drop ratio.

It is a further object of the present invention to provide a filter unit which is suitable for an air purification installation in shelters and security rooms.

Yet a further object of the present invention is to provide a low-resistance filter which can be used in combination with a hand crank driven air blower.

The present invention achieves the above objects by providing a low-resistance gas adsorption filter provided with an activated carbon bed of bulk density less than 0.6 gram/cubic centimeter, said activated carbon bed being free of chromium 6+ salt, said filter being characterized by a gas holding capacity exceeding 300,000 milligram Dimethylmethyl Phosphonate (DMMP)×minute/cubic meter and an airflow resistance such that the numerical value of air flow resistance in Pascal per millimeter of bed thickness does not exceed by more than 50% the numerical value of air velocity in centimeters per second.

In the above definition DMMP is a recognized simulant of nerve gas and especially of sarin.

In a preferred embodiment of the present invention there is provided a gas adsorption filter wherein said activated carbon bed has a particle size exceeding 12×20 mesh.

In a most preferred embodiment of the present invention there is provided a gas adsorption filter wherein said activated carbon bed further includes up to 0.1% Ag-salts.

In preferred embodiments of the present invention the numerical value of air flow resistance in Pascal per millimeter of bed thickness does not exceed the numerical value of air velocity in centimeters per second.

Yet further embodiments of the invention will be described hereinafter.

It will thus be realized that according to the invention, the above objects are achieved by reducing the pressure drop of the gas adsorption filter without loosing the efficiency of the adsorption process. Typically gas filters provide 100% adsorption by preventing easy air flow through the adsorption material itself by restricting the dimension of the channels through the media. It is obvious that narrow and long channels provide the best adsorption but have the highest pressure drop and that wide and short channels result in poorest adsorption performance and lowest pressure drop.

The velocity of the airflow is an important factor which has strong influence on the energy required to operate the filter system.

It has been found that the specific gravity of a filter bed, called bulk density, is closely related to the number and cross-sectional size of the channels. It was found that with a filter bed of specific gravity 0.5–0.55 and a filter bed thickness of 5–15 cm in combination with an air throughput of >20 cm/s, a pressure drop of less than 600 Pa can be achieved with excellent adsorption characteristic. This is a very substantial improvement relative to the M98 filter previously specified.

The filter of the present invention may be used as part of a NBC air filtration system having a blower of low energy consumption. In a typical system, energy consumption is less than 0.5 W/m$^3$/h.

Two advantages are gained thereby:
a. Operation is feasible using a hand crank or battery. The blower can force enough air through all elements of a NBC filtration system including the blast protection valve, prefilter, HEPA filter, gas adsorption filter, overpressure regulation valve and all interconnecting piping.
b. The temperature increase of the filtered air by the combination blower/filter is only about 4° C., so that in summer no substantial heat load increase falls on any operating air condition unit, and energy savings result. Forcing air through a conventional design filter increases incoming air temperature by about 15° C.

As is known, the impregnation of the activated carbon with metal ions and alkaline organic components have an important impact on the adsorption capacity of the filter. One major impregnation component used in conventional filters is Chromium 6+ salt, which enhances filter performance for the adsorption of blood poisons. Since these Chromium 6+ salts however are considered themselves hazardous and environmental unfriendly, it is desirable to eliminate the Chromium 6+ salt, as is achieved in the present invention.

Tests have been carried out on activated carbon filters not impregnated with Chromium 6+ salt. It was found that low-resistance filters could be created matching all the needed criteria, including low pressure drop, and good adsorption capacity at air velocities between 5 to more than 25 cm/s. Further, experiments resulted in the conclusion that improved adsorption capacities are reached when the sum of Cu and Zinc salts is less than 6% of the activated carbon and each salt is present at a concentration of less than 4% of said activated carbon bed. Furthermore, good results have also been achieved when the activated carbon contains additionally about 0.05% Ag and less than 1.2% TEDA (Triethylendiamine).

Thus according to the present invention there is now provided a low-resistance gas adsorption filter provided with an activated carbon bed of bulk density less than 0.6 gram/cubic centimeter, said activated carbon bed being free of chromium 6+ salt, said filter being characterized by a gas holding capacity exceeding 300,000 milligram Dimethylmethyl Phosphonate (DMMP)×minute/cubic meter and an airflow resistance of less than 16 Pascal per millimeter of bed thickness when air is blown therethrough at a rate of 15 centimeters/second.

In preferred embodiments of the present invention there is provided a gas adsorption filter having a total of Zn-salts and Cu-salts of less than 6% with each salt being present in an amount of less than 4% of the activated carbon in combination of less than 1.25% TEDA, said filter having an air velocity of more than 3 cm/s, a minimum gas capacity more than 300,000 mg DMMP×min/m$^3$ and an airflow resistance equal to or less than values presented in the following table:

| Air velocity [cm/s] | Air flow resistance per bed thickness [Pa/mm] |
| --- | --- |
| 3 | 3 |
| 6 | 6 |
| 10 | 9 |
| 15 | 14 |
| 21 | 19 |
| 28 | 26 |

Preferably, the activated carbon further comprises up to 0.1% Ag-salts.

Also preferred is a gas adsorption filter as defined wherein the activated carbon further comprises up to 1.5% Mo-salts.

In especially preferred embodiments of the present invention the bulk density of less than 0.6 s achieved by using a carbon particle size greater than 12×20 mesh.

Preferably, the bulk density of less than 0.6 is achieved by using carbon derived from non-mineral sources selected from the group consisting of coconut shells, wood and other plant components.

In other preferred embodiments of the present invention the bulk density of less than 0.6 is achieved by using in addition to the standard activated carbon more than 8% activated carbon coming from synthetic materials in the form of foams, fabrics or loose fibers.

In yet a further embodiment said adsorption materials are glued together by adhesives in a way that the bulk density is reduced compared to the unglued bulk density. The lower bulk density of the glued particle bed is due to the fact that the adhesive prevents the particles from taking up the most compact formation possible such as would result if loose particles were deposited in a tray and gently vibrated to settle by gravity into said most compact formation.

BRIEF DESCRIPTION OF THE FINDINGS

The invention will now be described in connection with certain preferred embodiments with reference to the following illustrative data, so that it may be more fully understood.

With specific reference now to the data in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

Two examples, one a flat filter bed and the other a radial filter are presented in the following tables. Attention is drawn to the low value of air flow resistance in comparison with the standard M98 Gas Filter previously specified.

EXAMPLE 1

Low Energy Flat Bed Filter:

|  | [inch] | [mm] |
|---|---|---|
| Filter length | 13.39 | 340.0 |
| Filter width | 10.63 | 270.0 |
| Filter bed thickness | 2.52 | 64.1 |

|  | [sq inch] | [cm$^2$] |
|---|---|---|
| Nominal face size | 142.29 | 918.0 |

|  | [cfm] | [m$^3$/h] |
|---|---|---|
| Airflow nominal | 51.25 | 82 |

|  | [inch/s] | [cm/s] |
|---|---|---|
| Air Velocity | 9.77 | 24.8 |

|  | [IWG] | [Pa] |
|---|---|---|
| Airflow resistance (when filter is new) | 1.57 | 400 |

| Gas Adsorption: | [mg × min/m$^3$] |  |
|---|---|---|
| DMMP CT-value (when filter is new) | >300,000 |  |
| Bulk density |  | 0.515 |

EXAMPLE 2

Low Energy Radial Filter:

| Filter | [inch] | [mm] |
|---|---|---|
| Length | 31.50 | 800.0 |
| Inside diameter | 9.17 | 232.9 |
| Outside diameter | 21.77 | 552.9 |
| Average diameter | 15.47 | 392.9 |
| Filter bed thickness | 2.83 | 72.0 |

|  | [sq.inch] | [cm$^2$] |
|---|---|---|
| Nominal face size | 1,528.60 | 9,861.9 |

|  | [cfm] | [m$^3$/h] |
|---|---|---|
| Airflow nominal | 550 | 880 |

|  | [inch/s] | [cm/s] |
|---|---|---|
| Air Velocity | 9.76 | 24.8 |

|  | [IWG] | [Pa] |
|---|---|---|
| Airflow resistance (when filter is new) | 1.18 | 300 |

| Gas Adsorption: | [mg × min/m$^3$] |  |
|---|---|---|
| DMMP CT-value (when filter is new) | >300,000 |  |
| Bulk density |  | 0.52 |

Each example shows clearly that with a similar bed depth, with the same air velocity, with the same adsorption capacity a much lower pressure drop is achieved in comparison with the M98 filter. The lower flow resistance is advantageous because of the resulting energy savings.

The improved performance is due to the formation of more effective adsorption channels, resulting from reduction of the bulk density of the activated carbon bed to values below 0.58 kg/liter.

It will be evident to those skilled in the art that the invention is not limited to the details of the foregoing data and that the present invention may be embodied in other specific forms without departing from the spirit or essential attributes thereof. The present embodiments are therefore to be considered in all respects as informative and not restrictive, the scope of the invention being indicated by the appended claims rather than by the foregoing description, and all changes which come within the meaning and range of equivalency of the claims are therefore intended to be embraced therein.

What is claimed is:

1. A low-resistance gas adsorption filter provided with an activated carbon bed of bulk density less than 0.6 gram/cubic centimeter, said activated carbon bed being free of chromium 6+salt, said filter being characterized by a gas holding capacity exceeding 300,000 milligram Dimethyl-methyl Phosphonate (DMMP)×minute/cubic meter and an airflow resistance such that the numerical value of air flow resistance in Pascal per millimeter of bed thickness does not exceed by more than 50% the numerical value of air velocity in centimeters per second.

2. A gas adsorption filter according to claim 1 wherein the numerical value of air flow resistance in Pascal per millimeter of bed thickness does not exceed the numerical value of air velocity in centimeters per second.

3. Gas adsorption filter according to claim 2 wherein said activated carbon bed has a particle size exceeding 12×20 mesh.

4. A gas adsorption filter according to claim 2, wherein said activated carbon bed has a total of less than 6% Zn-salts and Cu-salts, each salt being present in an amount of less than 4% of said activated carbon bed.

5. A gas adsorption filter according to claim 4 wherein said activated carbon bed contains less than 1.25% triethlendiamine.

6. A gas adsorption filter according to claim 5 wherein said activated carbon bed further includes up to 0.1% Ag-salts.

7. A gas adsorption filter according to claim 5 wherein said activated carbon bed further includes up to 1.5% Mo-salts.

8. A gas adsorption filter according to claim 1 wherein air is blown through said gas absorption filter with a blower at a rate of at least 3 centimeters/second.

9. A gas adsorption filter according to claim 1 wherein said activated carbon bed is derived from non-mineral sources selected from the group consisting of coconut shells, wood, other plant components and combinations thereof.

10. A gas adsorption filter according to claim 1 wherein said activated carbon bed includes standard activated carbon and more than 8% activated carbon derived from synthetic materials selected from the group containing foams, fabrics, loose fibers and combinations thereof.

11. A gas adsorption filter according to claim 1 wherein particles of adsorption materials are interconnected by an adhesive whereby the bulk density of said activated carbon bed is reduced as compared to the bulk density before application of said adhesive.

* * * * *